(12) United States Patent
Olsen et al.

(10) Patent No.: US 9,714,556 B2
(45) Date of Patent: Jul. 25, 2017

(54) SHEAR SEAL CHECK VALVE FOR USE IN WELLBORE FLUID

(71) Applicant: BAKER HUGHES INCORPORATED, Houston, TX (US)

(72) Inventors: Shawn A. Olsen, Spring, TX (US); Harry W. Bullock, Montgomery, TX (US)

(73) Assignee: BAKER HUGHES INCORPORATED, Houston, TX (US)

(*) Notice: Subject to any disclaimer, the term of this patent is extended or adjusted under 35 U.S.C. 154(b) by 275 days.

(21) Appl. No.: 14/075,521

(22) Filed: Nov. 8, 2013

(65) Prior Publication Data

US 2015/0129784 A1 May 14, 2015

(51) Int. Cl.
*E21B 34/00* (2006.01)
*E21B 34/10* (2006.01)
(Continued)

(52) U.S. Cl.
CPC .......... *E21B 34/063* (2013.01); *E21B 34/10* (2013.01); *E21B 49/10* (2013.01); *F16K 3/0254* (2013.01);
(Continued)

(58) Field of Classification Search
CPC ........ E21B 34/063; E21B 34/10; E21B 34/00; E21B 34/08; E21B 49/10; E21B 49/08;
(Continued)

(56) References Cited

U.S. PATENT DOCUMENTS

| 3,338,263 A * | 8/1967 | Altmeppen | F15B 11/22 |
| | | | 137/493.7 |
| 3,631,887 A * | 1/1972 | Schlechtriem | F16K 15/18 |
| | | | 137/522 |
| 4,456,028 A | 6/1984 | Watson | |
| 4,493,335 A | 1/1985 | Watson | |

(Continued)

FOREIGN PATENT DOCUMENTS

| WO | 2010111158 A2 | 9/2010 |
| WO | 2012136966 A2 | 10/2012 |

OTHER PUBLICATIONS

PCT/US2014/064597—International Search Report dated Feb. 27, 2015.

*Primary Examiner* — Kevin Murphy
*Assistant Examiner* — Kelsey Rohman
(74) *Attorney, Agent, or Firm* — Mossman, Kumar & Tyler, PC (57) ABSTRACT

An apparatus for controlling fluid flow from a first location to a second location includes a body, a valve, a shear seal, and a biasing member. The body has a fluid conduit and a chamber. The conduit has an inlet that communicates with the first location and an outlet that communicates with the second location. The valve is disposed in the chamber and has a seal separating the chamber into a pressure section and a flow section. The pressure section communicates with the outlet via an outlet fluid branch. The shear seal has a movable sealing element disposed on the valve and a stationary sealing element disposed in the body. The biasing member urges the valve to a closed position wherein the stationary sealing element sealingly engages the movable sealing element. Pressure communicated by the outlet fluid branch also urges the valve to the closed position.

18 Claims, 8 Drawing Sheets

(51) Int. Cl.
*E21B 34/06* (2006.01)
*E21B 49/10* (2006.01)
*F16K 3/02* (2006.01)
*F16K 15/02* (2006.01)

(52) U.S. Cl.
CPC ......... *F16K 15/025* (2013.01); *Y10T 137/786* (2015.04); *Y10T 137/7932* (2015.04)

(58) Field of Classification Search
CPC .............. E21B 49/081; Y10T 137/7837; Y10T 137/7854; Y10T 137/7859; Y10T 137/786; Y10T 137/7922; Y10T 137/7904; Y10T 137/7925; Y10T 137/7929; Y10T 137/7932
USPC ...... 137/511, 515, 516.11, 535, 516.13, 528, 137/538, 540, 542; 166/325; 251/176
See application file for complete search history.

(56) References Cited

U.S. PATENT DOCUMENTS

| | | | |
|---|---|---|---|
| 5,320,181 A | 6/1994 | Lantier, Sr. et al. | |
| 5,341,835 A * | 8/1994 | Lanning, II | F16K 3/0227 137/246.22 |
| 5,640,989 A * | 6/1997 | Nemoto | B60K 15/03519 137/202 |
| 5,873,414 A | 2/1999 | Von Gynz-Rekowski | |
| 6,585,048 B1 | 7/2003 | Heijnen | |
| 6,651,696 B2 | 11/2003 | Hope | |
| 2009/0016159 A1 | 1/2009 | Fraser et al. | |
| 2011/0100641 A1* | 5/2011 | Briquet | E21B 33/1275 166/373 |
| 2012/0006636 A1* | 1/2012 | Love | B60N 2/42745 188/297 |
| 2012/0273055 A1* | 11/2012 | Lirette | E21B 21/103 137/14 |

* cited by examiner

SHEAR SEAL CHECK VALVE FOR USE IN WELLBORE FLUID

FIELD OF THE DISCLOSURE

This disclosure pertains generally to devices and methods for conveying fluids in a borehole formed in a subsurface formation.

BACKGROUND OF THE DISCLOSURE

To obtain hydrocarbons such as oil and gas, well boreholes are drilled using a drill string having a bottomhole assembly (BHA). The BHA may include instruments and devices for forming the borehole, controlling borehole pressure, managing drilling fluid circulation, and measuring certain downhole operating parameters associated with the drill string. After the borehole has been formed, still further equipment may be used to test formation fluids or rock properties, isolate pay zones, etc. Some tools and instruments used during and after drilling incorporate flow control devices to control flow of a particular fluid. In some instances, the fluid may be a natural fluid (e.g., formation fluids), a functional fluid (e.g., drilling fluids), or a hydraulic fluid.

In one aspect, the present disclosure addresses the need for flow control devices that have enhanced reliability while used in subsurface applications such as those described above.

SUMMARY OF THE DISCLOSURE

In aspects, the present disclosure provides an apparatus for controlling fluid flow between a first location and a second location. The apparatus may include a body having a fluid conduit, the conduit having an inlet in fluid communication with the first location and an outlet in fluid communication with the second location, the body further having a chamber; a valve element disposed in the chamber, the valve element having a seal separating the chamber into a pressure section and a flow section, wherein the pressure section is in hydraulic communication with the outlet via an outlet fluid branch; a shear seal having at least one movable sealing element disposed on the valve element and at least one stationary sealing element disposed in the body; and a biasing member urging the valve element to a closed position wherein the at least stationary one sealing element is in sealing engagement with the at least one movable sealing element, wherein a pressure communicated by the outlet fluid branch also urges the valve element to the closed position.

In aspects, the present disclosure also provides an apparatus for controlling fluid flow between a first location and a second location that includes a manifold for using a fluid mover to convey fluid between the first location and the second location and at least one module received by the manifold. The at least one module may include a first fluid conduit connecting a first and a second connector, a coupling in fluid communication with the fluid mover and the first fluid conduit, and a plurality of flow control devices in fluid communication with the first fluid conduit, wherein each flow control device includes: a body having a fluid conduit, the conduit having an inlet in fluid communication with the first location and an outlet in fluid communication with the second location, the body further having a chamber in hydraulic communication with the outlet via an outlet fluid branch; a valve element disposed in the chamber; a shear seal having at least one movable sealing element disposed on the valve element and at least one stationary sealing element disposed in the body; and a biasing member urging the valve element to a closed position wherein the at least stationary one sealing elements is in sealing engagement with the at least one movable sealing element, wherein a pressure communicated by the outlet fluid branch also urges the valve element to the closed position. The module has a first and a second orientation when received by the manifold, the module conveying fluid only from the first connector to the second connector when in the first orientation and only from the second connector to the first connector when in the second orientation.

Examples of certain features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

In aspects, the present disclosure relates to devices and method for enhancing the reliability of flow control devices. Certain embodiments of the present disclosure include a self-piloting check valve that is actuated by borehole or formation fluid. The valve may employ shear seals to increase reliability by reducing the likelihood of debris fouling. Certain other embodiments may use shear seals with a "dirty fluid pressure relief valve." As used herein, the term "dirty" fluid is any fluid having a characteristic that may be harmful (e.g., cause erosion, corrosion, fouling, etc.) to the surfaces and materials making up a flow control device. For example, the fluid may be highly viscous and/or include entrained materials that are abrasive and can become lodged between contacting surfaces. Illustrative "dirty" fluids are naturally occurring fluids such as formation fluids and drilling fluids. The term "clean" fluid is a fluid that has one or more qualities that have been engineered or processed to a predetermined specification (e.g., viscosity, size of entrained particles, etc.). One illustrative "clean" fluid is hydraulic fluid. The teachings may be advantageously applied to a variety of systems both in the oil and gas industry and elsewhere. Merely for brevity, certain non-limiting embodiments will be discussed in the context of tools configured for wellbore uses.

Figure 1:
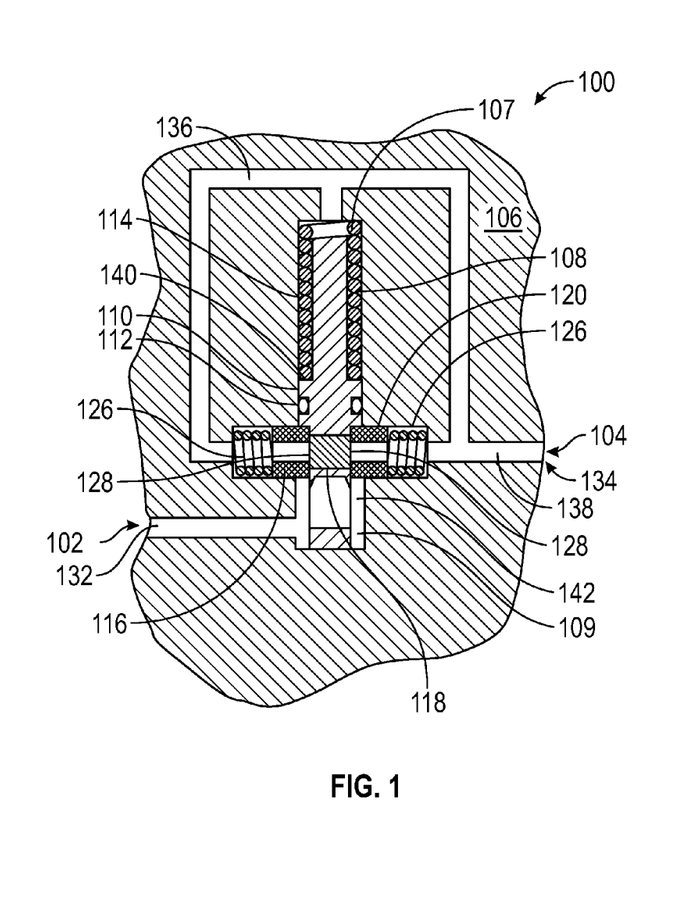
FIG. 1 shows a schematic of a flow control device that uses shear seals according to one embodiment of the present disclosure.

Referring initially to FIG. 1, there is schematically illustrated one embodiment of a flow control device 100 that may be used to control flow between a first location 102 (e.g., a subsurface formation) and a second location 104 (e.g., a fluid sampling tank or a wellbore annulus). In one configuration, the flow control device 100 allows unrestricted flow from the first location 102 to the second location 104, but blocks fluid flow from the second location 104 to the first location 102.

The flow control device 100 may include a body 106 that has a chamber 108 in which a valve element 110 translates. The valve element 110 may be a shuttle or other body that is shaped and dimensioned to selectively block fluid flow. The valve element 110 may include a seal 112 and a biasing member 114. The seal 112 forms a liquid tight fluid barrier between the valve element 110 and the body 106, which forms a pressure section 107 and a flow section 109. As discussed in greater detail below, varying pressure in the pressure section 107 and the flow section 109 can be used to displace the valve element 110. The biasing member 114 may be any feature that generates an axial force for displacing the valve element 110 to a closed position. Suitable biasing members include, but are not limited to, coiled springs, spring washers, leaf springs, etc.

The flow control device 100 also includes shear seal elements 116, 118, and 120. The shear seal elements 116 and 120 are each disposed in a bore formed in the body 106 and remain mostly stationary during operation. The shear seal elements 116 and 120 may be formed as disks, plates, or tubes. A tubular form may be suitable to accommodate fluid flow. The shear seal element 118 is fixed to and moves with the valve element 110. The shear seal element 118 may be formed as a cylinder, block, or plate that seats within a recess of the valve element 110. Alternatively, the shear seal element 118 may be integral with the valve element 110; e.g., a surface of the valve seal element 110 may be treated, shaped, or otherwise processes to present a shear seal surface. Thus, as opposed to elastomeric seals, these shear seal elements 116, 118 120 do not deform to form a seal.

In some embodiments, biasing members 126 may be used to push shear seal elements 116 and 120 into contact with the shear seal element 118. Although the biasing members 126 may cause some slight movement, the shear seal elements 116 and 120 are considered stationary for the purposes of the present disclosure. When the surfaces of the shear seal elements 116, 118 and 120 are in contact, a fluid tight barrier is formed that blocks fluid flow along a flow path 130 across the body 106. An illustrative sealing contact is show with numeral 128. Generally speaking, the shear seal surfaces in contact are relatively hard, flat, and smooth surfaces that have relatively low tolerances.

In one embodiment, the flow path 130 has an inlet 132 and an outlet 134. The outlet 134 includes two branches 136 and 138, each of which receives fluid from the flow section 109 via a separate connection. As shown, the branch 136 is in fluid communication with the pressure section 107. Therefore, fluid pressure at the outlet 134 can be transmitted to a pressure face 140 formed on the valve element 110.

The pressure applied to the pressure face 140 may be used to ensure that fluid flows in only one direction through the flow path 130. Specifically, the applied pressure generates a closing force that assists the biasing member 114 to move the valve element 110 to the closed position. It should be noted that the closing force applied to the valve element 110 increases as fluid pressure increases at the outlet 134, which assists in maintaining the valve element 110 in the closed position. The closing action may be in response to the occurrence of a predetermined pressure condition. The predetermined pressure condition may be a pressure at the outlet 134 exceeding a predetermined value, a pressure at the inlet 132 being less than a pressure at the outlet 134 by a predetermined amount, or a pressure differential between the inlet 132 and the outlet 134 exceeding a predetermined value or some other application-specific pressure condition.

When the fluid pressure is greater at the first location 102 than at the second location 104, the valve element 110 is piloted open. This is due to the pressure in the flow section 109 being greater than the pressure in the pressure section 107 by a preset value. Specifically, the pressure differential across the seal 112 is large enough to urge the valve element 110 and the seal 112 against the biasing member 114. To open, this fluid pressure must be high enough to overcome the frictional forces generated by the biasing members 126 acting on the shear seal elements 116-120 and the axial biasing force generated by the biasing member 114. The valve element 110 is axially displaced until a flow bore 142 formed in the valve element 110 aligns with the branches 136 and 138. When so positioned, the fluid flows into the inlet 132, through the flow bore 142, along the branches 136 and 138, and exits at outlet 134.

When the fluid pressure at the first location 102 drops below a preset value and/or does not exceed the pressure at the second location 104 by a preset value, the valve element 110 is piloted closed. This is due to the pressure in the flow section 109 being insufficient to counteract the pressure section 107 and the biasing force of the biasing element 114. In this situation, the pressure in the pressure section 107 assists the biasing member 114 in urging the valve element 110 to a closed position. The valve element 110 is axially displaced until the shear seal elements 116 and 120 come into contact with the shear seal element 118, and form sealing surfaces 128. When so positioned, the fluid flow is blocked between the inlet 132 and the branches 136 and 138.

The flow control elements according to the present disclosure are susceptible to numerous variants. Some illustrative and non-limiting embodiments are shown in FIGS. 2-5. For brevity, certain common elements such as the biasing members 126 will not be discussed.

Figure 2:
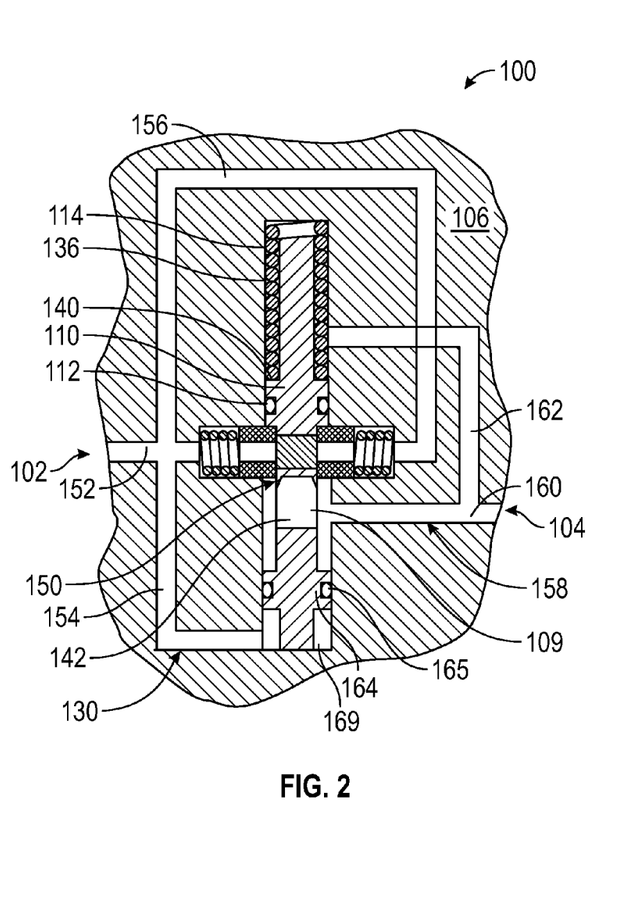
FIGS. 2-4 each show a schematic of a flow control device that uses shear seals according to other embodiments of the present disclosure.

Referring to FIG. 2, in one variant, the flow control device 100 includes a body 106, a valve element 110, a seal 112, a biasing member 114, shear seal elements, collectively 150, and a flow path 130 across the body 106 as previously discussed. In this embodiment, the valve element 110 includes a flanged section 164 that includes a secondary seal 165 that separates a second pressure section 169 from the flow section 109. As before, the flow path 130 has an inlet 152 and an outlet 158. However, the inlet 152 has a first branch 154 that communicates pressure to the second pressure section 169 and a second branch 156 that conveys fluid to the flow section 109. The second branch 156 has two separate fluid connections to the flow section 109. The outlet 158 has a first branch 160 that receives fluid from the flow section 109 and a second branch 162 that communicates pressure to the pressure section 107. Thus, the second branch 162 does not separately connect to the flow section 109.

Fluid flow across the body 106 occurs when the inlet second branch 156, the flow bore 142 of the valve element 110, and the outlet first branch 160 are in fluid communication with one another. This will be referred to as the open position. The valve element 110 moves to the open position when the inlet first branch 154 increases the pressure in the second pressure section 169. When the pressure applied to the flanged section 164 is sufficient to overcome the biasing force of the biasing element 114 and frictional forces, the valve element 110 slides axially until the flow bore 142 aligns with the inlet second branch 156.

The valve element 110 moves to the closed position upon occurrence of a predetermined pressure condition; e.g., when the fluid pressure at the outlet 158 exceeds a predetermined value. The outlet second branch 162 applies fluid pressure to the pressure face 140 to urge the valve element 110 to the closed position, which occurs when the inlet first branch 154, the flow bore 142 of the valve element 110, and the outlet first branch 160 are not in fluid communication with one another.

Figure 3:
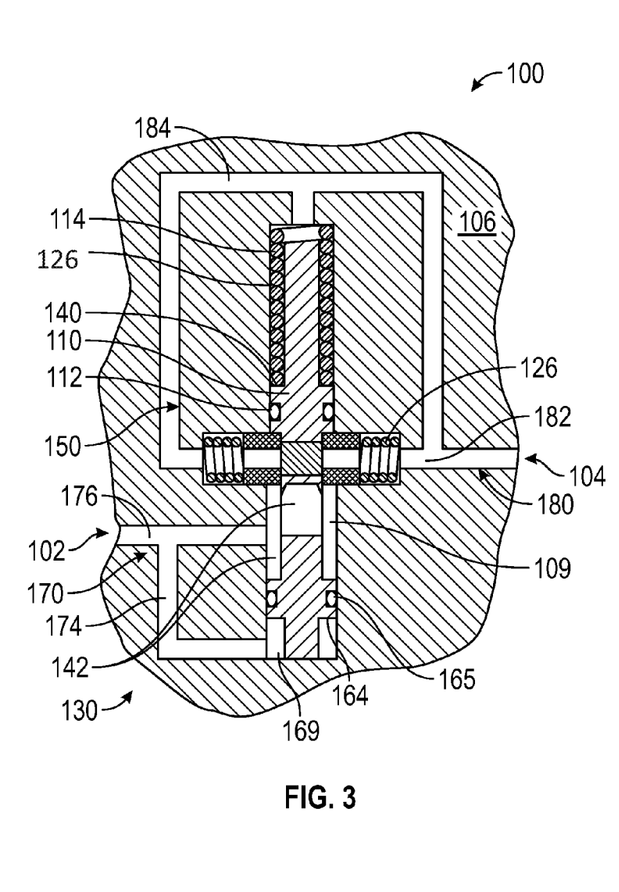

Referring to FIG. 3, in another variant, the flow control device 100 includes a body 106, a valve element 110, a seal 112, a biasing member 114, shear seal elements, collectively 150, and a flow path 130 across the body 106 as previously discussed. In this embodiment, the flow path 130 has an inlet 170 having a first branch 174 and a second branch 176 and an outlet 180 having a first branch 182 and a second branch 184. Additionally, the valve element 110 includes a flanged section 164 that includes an optional secondary seal 165 that separate a second pressure section 169 from the flow section 109. Fluid flow across the body 106 occurs when the inlet first branch 174, the flow bore 142 of the valve element 110, and the outlet branch 182, 184 are in fluid communication with one another; i.e., the open position. The inlet second branch 174 conveys fluid into the second pressure section 169, which applies fluid pressure to the flanged section 164 to urge the valve element 110 to the open position.

In a manner previously discussed, the outlet second branch 184 applies fluid pressure to the pressure face 140 to urge the valve element 110 to the closed position; i.e., when the inlet first branch 176, the flow bore 142 of the valve element 110, and the outlet branches 182, 184 are not in fluid communication with one another.

Figure 4:
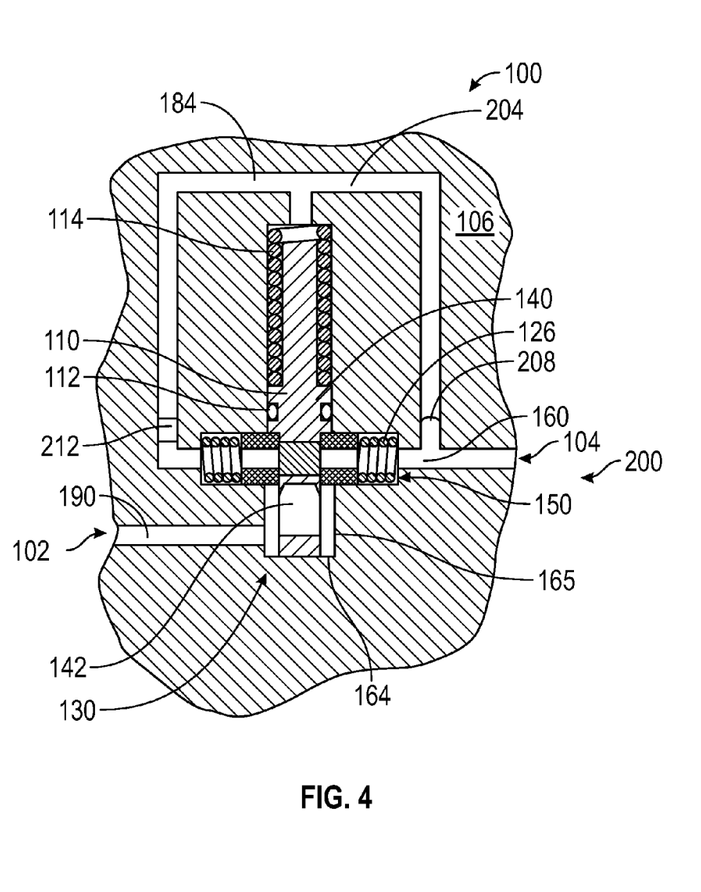

Referring to FIG. 4, in yet another variant, the flow control device 100 includes a body 106, a valve element 110, a seal 112, a biasing member 114, shear seal elements, collectively 150, and a flow path 130 across the body 106 as previously discussed. In this embodiment, the flow path 130 has an inlet 190 and an outlet 200. Additionally, the body 106 includes a pressure conduit 204 that is filled with a pressure transmitting media, such as a hydraulic fluid or grease (not shown). The pressure transmitting media may be a fluid that is different than the fluid flowing through the flow control device 100. A pressure communicator 208 may be used to block fluid communication between the pressure conduit 204 and the outlet 200 while allowing the pressure in the outlet 200 to be communicated to the pressure transmitting media (not shown) in the pressure conduit 204. Illustrative pressure communicators include, but are not limited to, pistons, diaphragms, and membranes. Thus, the pressure communicator 208 can increase and decrease the pressure in the pressure conduit 204 using the pressure of the fluid at the outlet 200. As discussed previously, this applied pressure may be used to assist in closing the valve element 110 in a manner previously discussed. A plug or barrier 212 may be used to seal off and isolate the hydraulic fluid (not shown) in the pressure conduit 204 from the fluid flowing through the body 106.

Still another variant (not shown) may be based on the FIG. 1 embodiment. The variant may be similar to the flow control device 100 of FIG. 1 in that the variant generally may include a body 106 and a valve element 110. However, the flow conduits and the shear seal assembly may be varied in certain aspects.

First, the outlet 134 includes two branches 136 and 138, but only one of which receives fluid from the flow section 109. Thus, the branch 136 is only in fluid communication with the pressure section 107 and the branch 138 is only in fluid communication with the flow section 109. Therefore, only one stationary shear seal element 120 is needed to block flow. In this variant, the shear seal element 116 may be replaced with a block, plug, cylinder or other support element that does not have a shear seal surface. Still, a biasing member 126 may be used to push the support element, such as a cylinder block (not shown), into contact with the shear seal element 118, which then presses against the shear element 120. When the surfaces of the shear seal elements 118 and 120 are in contact, a fluid tight barrier is formed that blocks fluid flow along a flow path 130 across the body 106.

Figure 5:
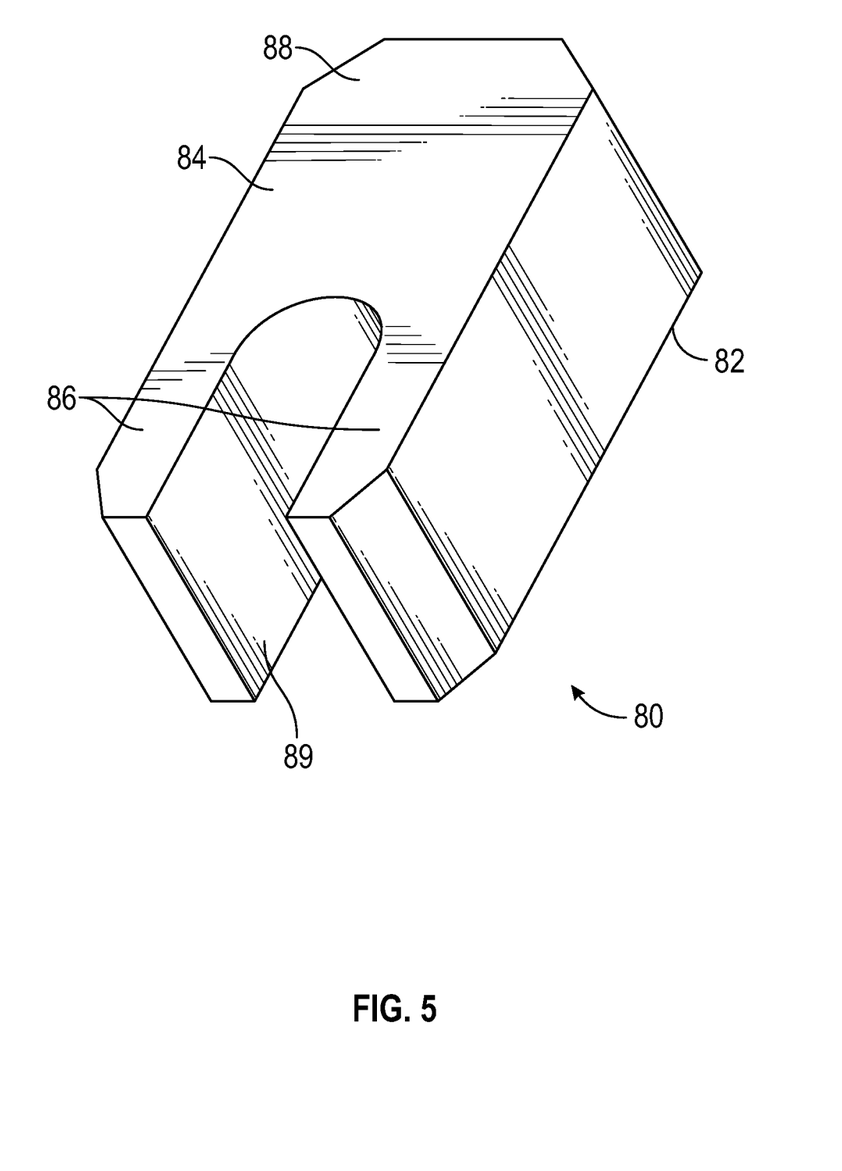
FIG. 5 shows an isometric view of a movable shear seal member according to one embodiment of the present disclosure.

Second, referring to FIGS. 1 and 5, the shear seal element 118 may be formed as a platen member 80 that includes contact surfaces 82 and 84. The platen member 80 also includes support arms 86 that extend from a landing portion 88. A flow gap 89 separates the arms 86 such that the arms 86 are cantilevered; i.e., connected at only one end. One or both of the contact surfaces 82 and 84 may be polished and smooth surfaces that are relatively hard. During the closed position, the landing 88 is adjacent to the shear seal element 120. The biasing member 126 pushes the support member (not shown, but in place of shear seal element 116) against the landing portion 88. The landing portion 88 is pushed against the shear seal element 120, which may or may not include a biasing member 126. Thus, a shear seal element 118 is formed in the flow section 109 at the contacting shear seal surfaces.

During the open position, only the support arms 86 are adjacent to the shear seal element 120 and the support element that is in place of the shear seal element 116. The support arms 86 are formed to have sufficient length so that the support element (not shown) and the seal element 120 seal flatly and cannot rock or pivot. Additionally, in some embodiments, the flow gap 89 is sized to expose substantially all of the opening in the shear seal element 120 to fluid flow. Stated differently, the support arms 86 do not substantially block flow into the fluid branch 138. By substantially, it is mean block flow no more than 40%.

In still other variants, a separate control line may be used to flow fluid into the pressure section 107 to pilot the valve element 110 to the closed position. This fluid may be different from the fluid flowing through the flow control device. For instance, a clean hydraulic fluid may be used to pilot the valve element 110 closed and the flow control device may be used to control the flow of drilling mud.

In certain embodiments, the flow control devices 100 may be used in a reversible manifold. For example, the above-described valves may be arranged to control flow in connection with a fluid mover. As used herein, a fluid mover is any device that adds energy to a fluid stream, e.g., centrifugal pumps, turbines, piston pumps, reciprocating pumps, etc.

As discussed below, the flow control devices 100 may be arranged within the manifold to allow fluid to be selectively reversed.

Figure 6A:
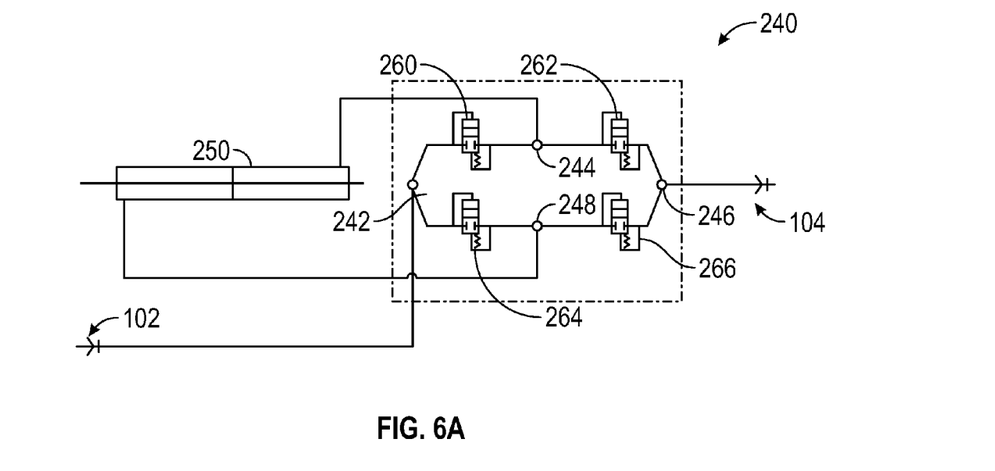
FIGS. 6A-B show a schematic of a flow control device that uses shear seals in a reversible manifold according to one embodiment of the present disclosure.

Referring to FIG. 6A, in one embodiment, a "plug-in" manifold valve block 240 may include symmetrical fluid connections 242, 244, 246, and 248. Connections 244, 248 provide fluid communication between a reciprocating pump 250 and the manifold 240. Connections 242, 246 provide fluid communication between a first location 102 (e.g., an uphole location) and a second location 104 (e.g., a downhole location). The manifold valve block 240 also includes flow control devices 260, 262, 264, and 266, which may be any of the flow control devices 100 previously described, that allow fluid flow in only one direction. In one arrangement, the pump 250 may be used to draw fluid from the downhole location 104, via connection 246, through flow control devices 262, 260, and pump out the fluid via connection 246 to the uphole location 102. The reciprocating action also allows the pump 250 to draw fluid from the downhole location 104, via connection 248, through flow control devices 266, 264, and pump out the fluid via connection 246 to the uphole location 102.

Figure 6B:
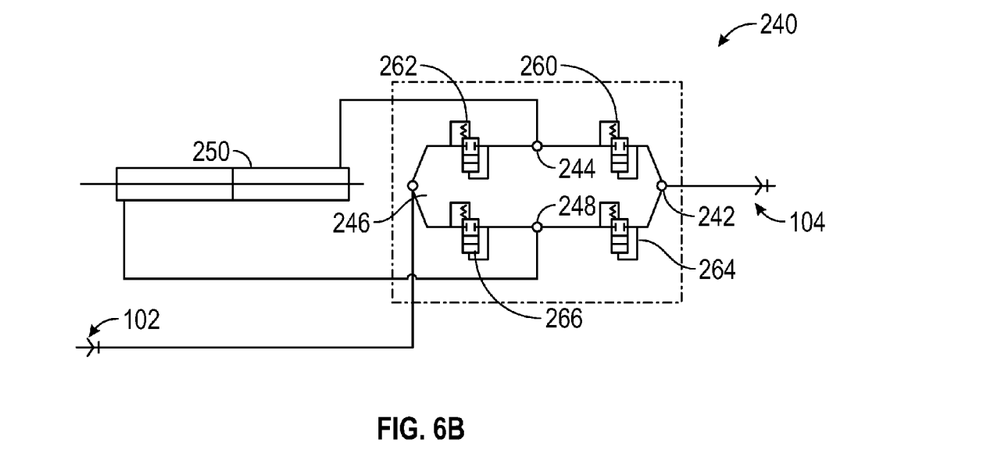

Referring now to FIG. 6B, the manifold may be decoupled from the pump 250 to switch the flow direction. The flow direction may be reversed by switching the positions of the connections 242 and 244. In the reversed arrangement, the pump 250 may be used to draw fluid from the uphole location 102, via connection 246, through flow control devices 262, 260, and pump out the fluid via connection 242. The reciprocating action also allows the pump 250 to draw fluid from the uphole location 102, via connection 246, through flow control devices 266, 264, and pump out the fluid via connection 242. As should be appreciated, the pump 250 may be easily preconfigured to pump uphole or pump downhole. The flow lines shown in FIGS. 5 and 6 may be wellbore fluid, and not hydraulic oil. Therefore, such reconfiguring has advantage because it would not require assembly or disassembly of a circuit containing hydraulic oil, but only to unplug the manifold 240, rotate the connections, and reconnect the manifold 240 to the pump 350.

Figure 7:
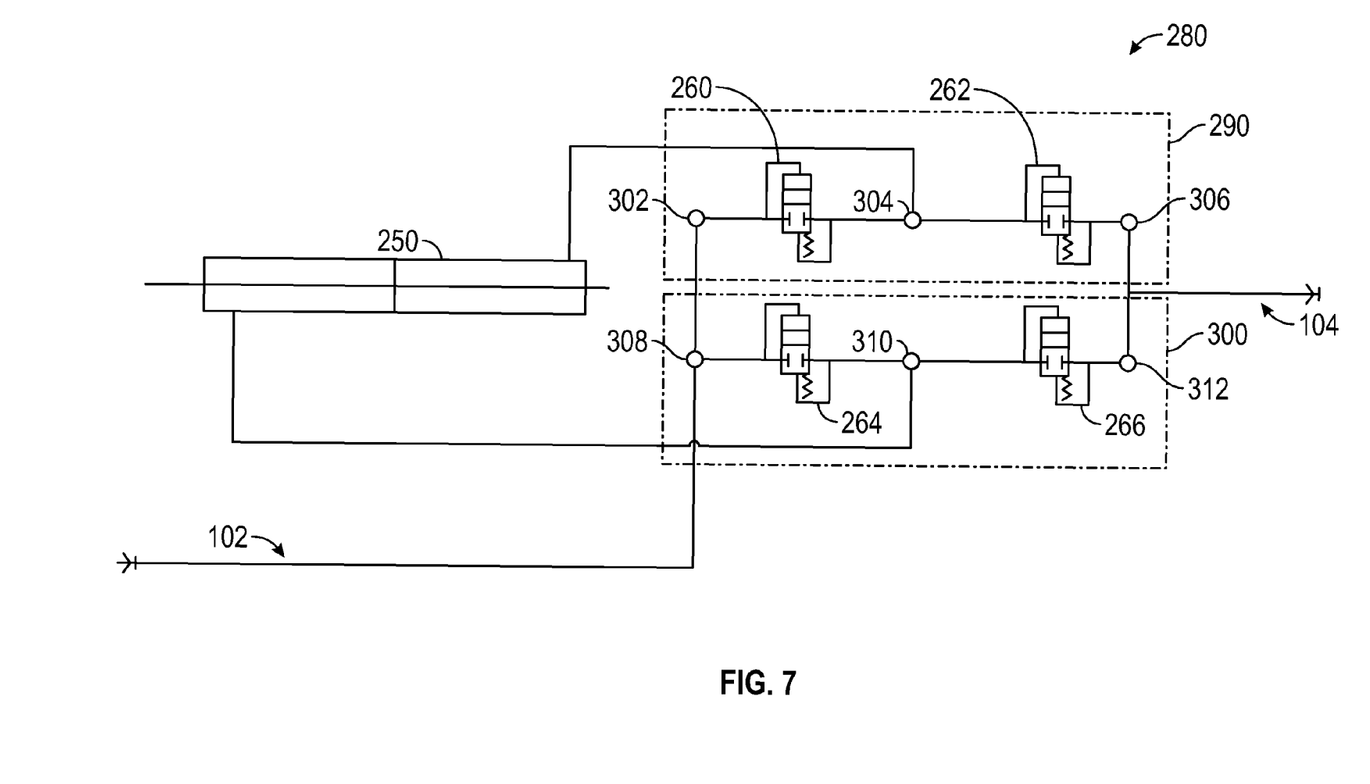
FIG. 7 shows a schematic of a flow control device that uses shear seal in a reversible manifold according to another embodiment of the present disclosure.

Referring to FIG. 7, there is shown another embodiment of flow control devices used in a reversible manifold 280 having a first module 290 and a second module 300. In this embodiment, a "plug-in" reversible manifold 280 may include symmetrical fluid connections 302, 304, 306, 308, 310 and 312. Connections 304, 310 provide fluid communication between a reciprocating pump 250 and the second module 300. Connections 302, 308, 306, and 312 provide fluid communication between a first location 102 (e.g., an uphole location) and a second location 104 (e.g., a downhole location). The first manifold module 290 includes connections 302, 304, and 306 and flow control devices 260 and 262. A second module 300 includes connections 308, 310, and 312 and flow control devices 264 and 266. The flow control devices 260, 262, 264, and 266 may be any of the flow control devices 100 previously described that allow flow in only one direction. To reverse flow, the first module 290 is removed and flipped to reverse the positions of the connections 302 and 306. Also, the second module 300 is removed and flipped to reverse the positions of the connections 308 and 312. After the blocks 280 and 290 have been reconnected to the pump 250, the flow is now in a reversed direction.

Figure 8:
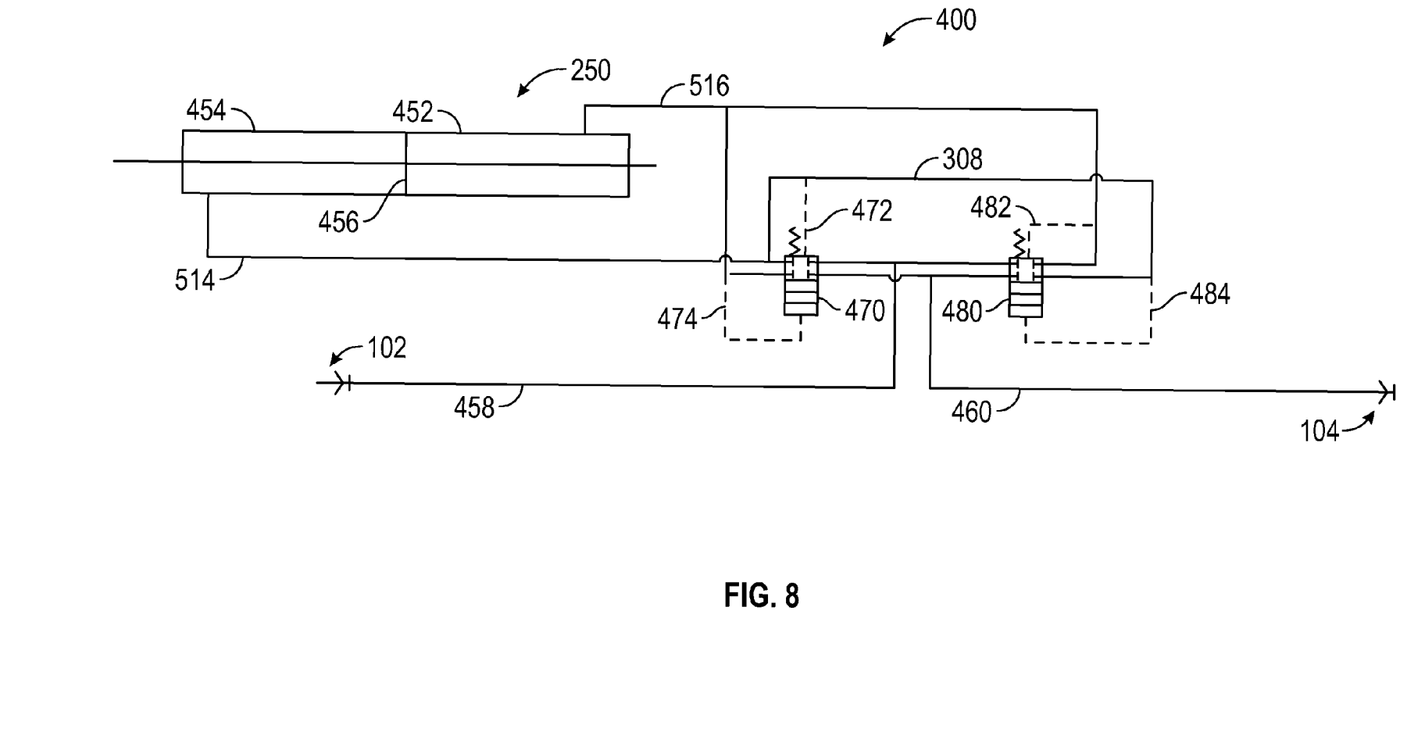
FIG. 8 shows a schematic of another flow control assembly that uses shear seal in a reversible manifold according to another embodiment of the present disclosure.

Referring to FIG. 8, there is shown one embodiment of a "dirty valve" system that uses fluids other than clean hydraulic fluids (or "dirty" fluids) to pilot a valve to the open and closed positions. In one embodiment, the system 400 may include a reciprocating pump 250. The pump may have first and second chambers 452 and 454, respectively, and a piston 456 that varies the volume of each of the chambers 452 and 454. Lines 458, 460 provide fluid communication between a first location 102 (e.g., an uphole location) and a second location 104 (e.g., a downhole location), respectively. The system 400 also includes a pair of flow control devices 470 and 480 that control flow between the pump 250 and the lines 458 and 460.

Figure 9A:
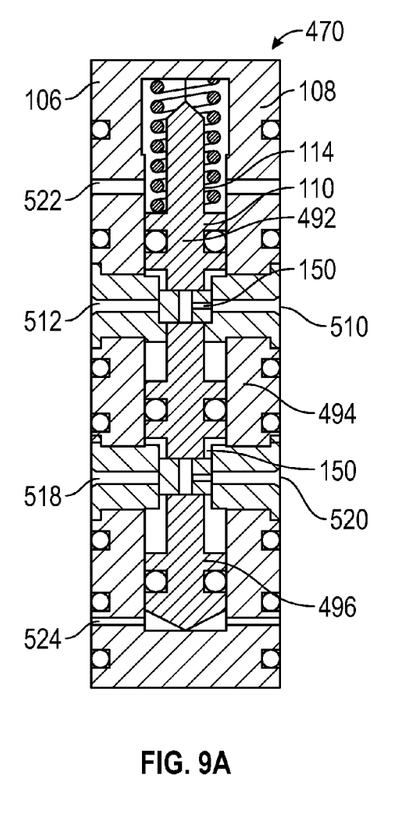
FIG. 9A-B shows a schematic of another flow control device that uses shear seal according to embodiment of the present disclosure.
Figure 9B:
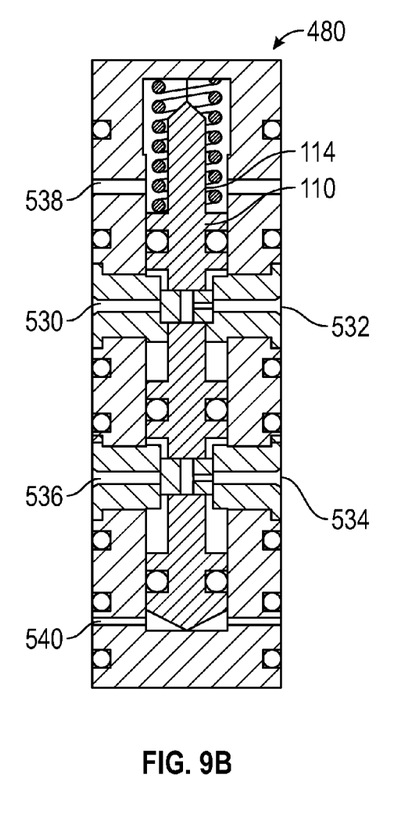

Referring now to FIGS. 9A and 9B, there are shown further details for the first and second flow control devices 470 and 480. Because of similarities in construction, certain features are discussed only in connection with the first flow control device 470 for brevity. The first flow control device 470 may include a body 106 that has a chamber 108 in which a valve element 110 translates. The valve element 110 may be a shuttle or other body that is shaped and dimensioned to selectively block fluid flow. The valve element 110 may include sealing flanges 490, 492, 496, and a biasing member 114. The flow control device 470 also includes shear seal assemblies 150. The gaps between the sealing flanges 490, 492, 494 form fluid paths across the first flow control device 470. The shear seal assemblies 150 selectively block flow across these gaps in a manner previously discussed.

The various fluid paths associated the first flow control device 470 will be described with reference to FIGS. 8 and 9A. In the arrangement shown, the flow control device 470 receives fluid from the line 458 through an inlet 510 and directs this fluid via an outlet 512 to a line 514 connected to the second chamber 454. The flow control device 470 receives fluid from the first chamber 452 via line 516 through an inlet 518 and directs this fluid via an outlet 520 to the line 460. The first control device 470 also includes a first port 522 and a second port 524. The first port 522 receives a pressurized fluid via the line 472, which is connected to line 514, to assist the biasing element 114 in maintaining the valve element 110 in the closed position. The second port 524 receives a pressurized fluid via the line 474, which is connected to line 516, to urge the valve element 110 to the open position.

The various fluid paths associated the second flow control device 480 will be described with reference to FIGS. 8 and 9B. In the arrangement shown, the second flow control device 480 receives fluid from the line 458 through an inlet 530 and directs this fluid via an outlet 532 to the line 516 connected to the first chamber 452. The flow control device 480 receives fluid from the second chamber 454 via line 514 through an inlet 534 and directs this fluid via an outlet 536 to the line 460. The second control device 480 also includes a first port 538 and a second port 540. The first port 538 receives a pressurized fluid via the line 482, which is connected to line 516, to assist the biasing element 114 in maintaining the valve element 110 in the closed position. The second port 540 receives a pressurized fluid via the line 484, which is connected to line 514, to urge the valve element 110 to the open position.

In one mode of operation, the piston 456 initiates a first stroke by first reducing the volume of the first chamber 452 while increasing the volume of second chamber 454. This action forces fluid from the chamber 452 via the line 516 into and through the valve 470. It should be noted that the pressure in the line 516 is transmitted to the port 538 of the flow control device 480, which keeps the flow control device 480 in the closed position. At the same time, the pressure in the line 516 is transmitted to the port 524 of the flow control device 470, which maintains the flow control device 470 in the open position. Thus, the fluid flows through the flow control device 470 to the line 460. Simultaneously, the increasing volume in the second chamber 454 creates a negative pressure that draws fluid from the line 458, across the open flow control device 470, and into the line 514. Thus, the chamber 454 fills with fluid as fluid is ejected from the chamber 452.

After completing this first stroke, the piston 456 reduces the volume of the second chamber 454 while increasing the volume of first chamber 452. This action forces fluid from the second chamber 454 via the line 514 into and through the valve 480. It should be noted that the pressure in the line 514 is transmitted to the port 522 of the flow control device 470, which keeps the flow control device 470 in the closed position. At the same time, the pressure in the line 514 is transmitted to the port 540 of the flow control device 480, which maintains the flow control device 480 in the open position. Thus, the fluid flows through the flow control device 480 to the line 460. Simultaneously, the increasing volume in the first chamber 452 creates a negative pressure that draws fluid from the line 458, across the open flow control device 480, and into the line 516. Thus, the chamber 452 fills with fluid as fluid is ejected from the chamber 452.

Figure 10:
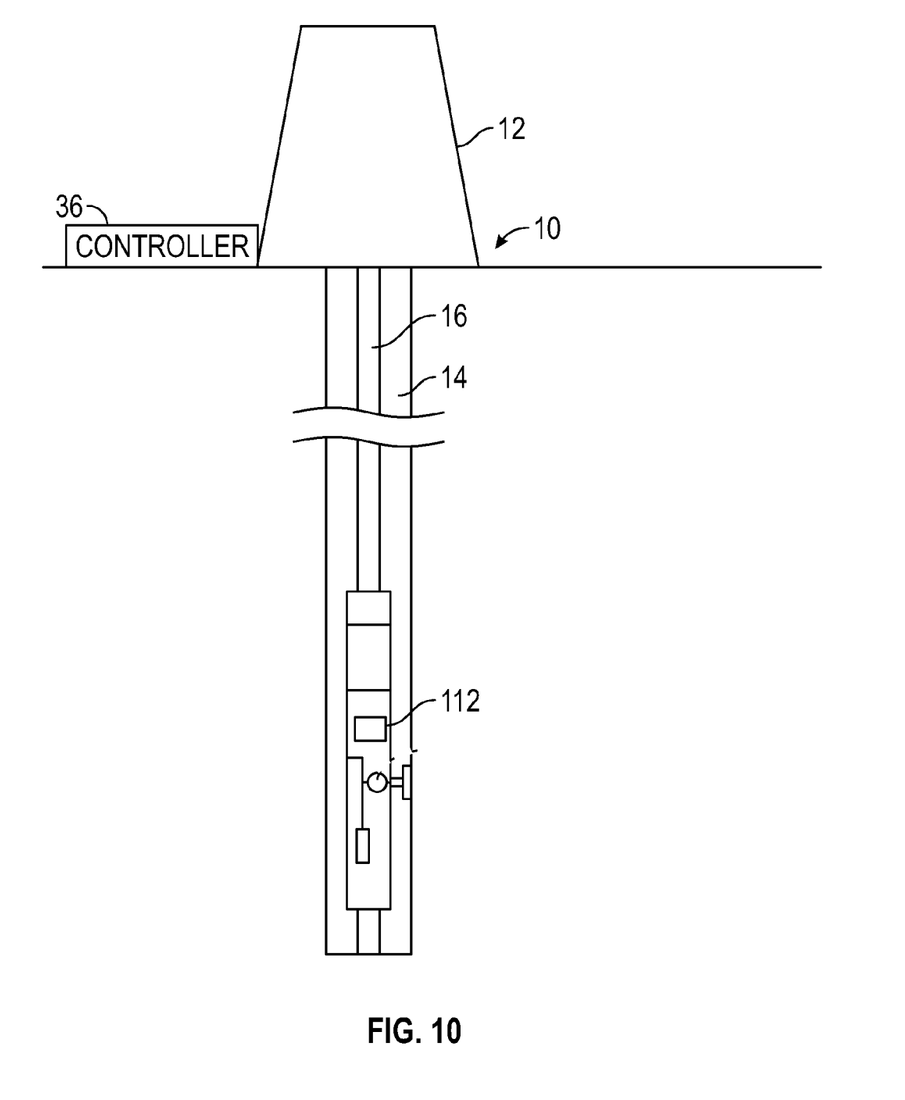
FIG. 10 shows a schematic of a downhole tool deployed in a wellbore that may use one or more flow control devices according to the present disclosure.

As noted previously, the teachings of the present disclosure may be used in any number of industries. One non-limiting application is for tools used in a wellbore. FIG. 10 schematically illustrates a wellbore system 10 deployed from a rig 12 into a borehole 14. While a land-based rig 12 is shown, it should be understood that the present disclosure may be applicable to offshore rigs and subsea formations. In some embodiments, the wellbore system 10 may be a drilling system configured to form the borehole 14 using tools such as a drill bit (not shown). In such embodiments, the carrier 16 may be a coiled tube, casing, liners, drill pipe, etc. In other embodiments, the wellbore system 10 may be conveyed with a non-rigid carrier. In such arrangements, the carrier 16 may be wirelines, wireline sondes, slickline sondes, e-lines, etc. The term "carrier" as used herein means any device, device component, combination of devices, media and/or member that may be used to convey, house, support or otherwise facilitate the use of another device, device component, combination of devices, media and/or member.

The wellbore system 10 may include a number of tools, instruments, and devices that utilize fluid flow to perform desired functions. Illustrative devices include pumps and valves. As is known, fluids in the borehole 14 can include entrained material that can clog these flow control devices. The shear seal arrangements of the present disclosure may be used in such devices to render flow control devices less susceptible to clogging and reduced operating efficiency. These shear seal arrangements may be particularly effective when the fluid being conveyed is a fluid other than a clean hydraulic fluid; e.g., drilling fluid, a formation fluid, etc.

While the foregoing disclosure is directed to the one mode embodiments of the disclosure, various modifications will be apparent to those skilled in the art. It is intended that all variations be embraced by the foregoing disclosure.

We claim:

1. An apparatus for controlling fluid flow from a first location to a second location, comprising:
    a body having a fluid conduit, the conduit having an inlet in fluid communication with the first location and an outlet in fluid communication with the second location, the body further having a chamber;
    a valve element disposed in the chamber, the valve element having a seal separating the chamber into a pressure section and a flow section, wherein the pressure section is in hydraulic communication with the outlet via an outlet fluid branch;
    a shear seal having at least one movable sealing element disposed on the valve element and a first and a second stationary sealing element disposed in the body, the seal of the valve element being positioned between the pressure section and the at least one movable sealing element; and
    wherein the shear seal has a closed position when the first and the second stationary sealing element are each in sealing engagement with the at least one movable sealing element,
    wherein a pressure communicated by the outlet fluid branch also urges the valve element to the closed position and maintains the valve element in the closed position,
    wherein the first stationary sealing element, the second stationary sealing element, and the at least one movable sealing element are serially aligned along an axis of a flow path while in the closed position,
    wherein the shear seal has an open position wherein fluid flows through the flow path when the at least one movable sealing element is serially misaligned with the axis of the flow path,
    wherein the first seal element and the second seal element are in fluid communication with the inlet when the valve element is in the closed position; and
    a biasing member urging the valve element to the closed position.

2. The apparatus according to claim 1, wherein the valve element includes a pressure face on which the pressure communicated by the outlet fluid branch acts, and wherein the first and the second stationary sealing elements are each a disk disposed in a bore formed in the body, the first and the second stationary sealing elements each having a bore through which fluid flows between the inlet and the outlet only in the open position.

3. The apparatus according to claim 1, wherein the biasing member urges the valve element to the closed position upon occurrence of one of (i) a pressure at the outlet exceeding a predetermined pressure, and (ii) a pressure at the inlet being less than a pressure at the outlet by a predetermined amount, (iii) a pressure differential between the outlet and the inlet exceeding a predetermined value.

4. The apparatus according to claim 1, wherein the outlet includes a second outlet fluid branch having a first fluid connection with the flow section and the outlet fluid branch has a fluid connection with the pressure section, the fluid in the outlet fluid branch being isolated from the fluid in the flow section.

5. The apparatus according to claim 1, wherein the at least one movable sealing element includes a landing portion having at least one seal surface and a plurality of arms extending from the landing, wherein the at least one seal surface is positioned adjacent to the at least one stationary seal element in the closed position and the plurality of arms are positioned adjacent the at least one stationary element in the open position.

6. The apparatus according to claim 1, wherein a pressure communicated to the valve element by the inlet urges the valve element to the open position.

7. The apparatus of claim 1, wherein the valve element includes a flange formed adjacent to a flow bore and on an opposite side of the at least one movable sealing element, the flange forming a second pressure section.

8. The apparatus of claim 1, further comprising a pressure transmitting media in the outlet fluid branch that is different from the fluid flowing through the body.

9. The apparatus of claim 1, wherein the fluid conduit and valve element are configured to increase a closing force applied to the valve element as the pressure in the second location increases, the closing force urging the valve element to the closed position.

10. The apparatus of claim 1, wherein the at least one movable element is formed as a platen member that includes a first and a second contact surface, the platen member including a first and a second support arm that are separated by a flow gap such that the first and the second support arms are cantilevered.

11. The apparatus of claim 1, wherein the first and the second stationary sealing elements each have a bore in fluid communication with the inlet in the open position and isolated from the inlet in the closed position.

12. A method for controlling fluid flow from a first location to a second location, comprising:
    positioning a valve between the first location and the second location; the valve having:
        a body having a fluid conduit, the conduit having an inlet in fluid communication with the first location and an outlet in fluid communication with the second location, the body further having a chamber;
        a valve element disposed in the chamber, the valve element having a seal separating the chamber into a pressure section and a flow section, wherein the pressure section is in hydraulic communication with the outlet via an outlet fluid branch;
        a shear seal having at least one movable sealing element disposed on the valve element and a first and a second stationary sealing element disposed in the body, the seal of the valve element being positioned between the pressure section and the at least one movable sealing element; and
        wherein the shear seal has an open position when the first and the second stationary sealing element are in sealing engagement with the at least one movable sealing element,
        wherein a pressure communicated by the outlet fluid branch also urges the valve element to the closed position and maintains the valve element in the closed position,
        wherein the first stationary sealing element, the second stationary sealing element, and the at least one movable sealing element are serially aligned along an axis of a flow path while in the closed position,
        wherein the shear seal has an open position wherein fluid flows through the flow path when the at least one movable sealing element is serially misaligned with the axis of the flow path,
        wherein the first seal element and the second seal element are in fluid communication with the inlet when the valve element is in the closed position; and
        a biasing member urging the valve element to the closed position;
    communicating fluid between the second location and an outlet of the conduit;
    controlling fluid flow in the conduit using the valve;
    applying a pressure at the outlet fluid branch to urge the valve element to the closed position; and
    allowing only flow from the first location to the second location by maintaining the valve element in the closed position using the pressure at the outlet fluid branch.

13. The method according to claim 12, wherein the outlet includes a second outlet fluid branch having a first fluid connection with the flow section and the outlet fluid branch has a fluid connection with the pressure section, wherein the at least one movable sealing element includes a landing portion having at least one seal surface and a plurality of arms extending from the landing portion, and further comprising:
    isolating the fluid in the outlet fluid branch from the fluid in the flow section;
    positioning the at least one seal surface adjacent the at least one stationary seal element in the closed position; and
    positioning the plurality of arms adjacent the at least one stationary element in the open position.

14. The method according to claim 12, further comprising urging the valve element to the open position using a pressure communicated to the valve element by the inlet.

15. The method of claim 12, further comprising disposing a pressure transmitting media in the outlet fluid branch that is different from the fluid flowing through the body.

16. The method of claim 12, further comprising increasing a closing force applied to the valve element as the pressure in the second location increases, the closing force urging the valve element to the closed position.

17. An apparatus for controlling fluid flow from a first location to a second location, comprising:
    a manifold for using a fluid mover to convey fluid between the first location and the second location;
    at least one module received by the manifold, the at least one module having:
        a first fluid conduit connecting a first and a second connector,
        a coupling in fluid communication with the fluid mover and the first fluid conduit, and
        a plurality of flow control devices in fluid communication with the first fluid conduit, wherein each flow control device includes:
            a body having a fluid conduit, the conduit having an inlet in fluid communication with the first location and an outlet in fluid communication with the second location, the body further having a chamber in hydraulic communication with the outlet via an outlet fluid branch;
            a valve element disposed in the chamber, wherein the valve element has a flow bore;
            a shear seal having at least one movable sealing element disposed on the valve element and a first and a second stationary sealing element disposed in the body; and
            a biasing member urging the valve element to a closed position wherein the first and a second stationary sealing elements are in sealing engagement with the at least one movable sealing element,
            wherein a pressure communicated by the outlet fluid branch also urges the valve element to the closed position and maintains the valve element in the closed position, wherein the first stationary sealing element, the second stationary sealing element, and the at least one movable sealing element are serially aligned with an axis of a flow path in the closed position, and
            wherein the fluid flows through the flow bore of the valve element when the first stationary seal element, the second stationary seal element, and the at least one movable sealing element are serially misaligned with the axis of the flow path.

18. The apparatus of claim 17, wherein the at least one module includes a plurality of modules, the plurality of modules cooperating to convey fluid between the first location and the second location.

\* \* \* \* \*